Sept. 19, 1961

A. E. SLADE 3,001,179

PRE-WIRED CRYOTRON MEMORY

Filed March 13, 1957

2 Sheets-Sheet 1

INVENTOR.
ALBERT E. SLADE

BY

Blair and Spencer
ATTORNEYS

Sept. 19, 1961 A. E. SLADE 3,001,179

PRE-WIRED CRYOTRON MEMORY

Filed March 13, 1957 2 Sheets-Sheet 2

INVENTOR.

ALBERT E. SLADE

BY

Blair and Spencer

ATTORNEYS

United States Patent Office
3,001,179
Patented Sept. 19, 1961

3,001,179
PRE-WIRED CRYOTRON MEMORY

Albert E. Slade, Cochituate, Mass., assignor to Arthur D. Little, Inc., Cambridge, Mass.

Filed Mar. 13, 1957, Ser. No. 645,776
19 Claims. (Cl. 340—173.1)

Figures 1, 2, 3:
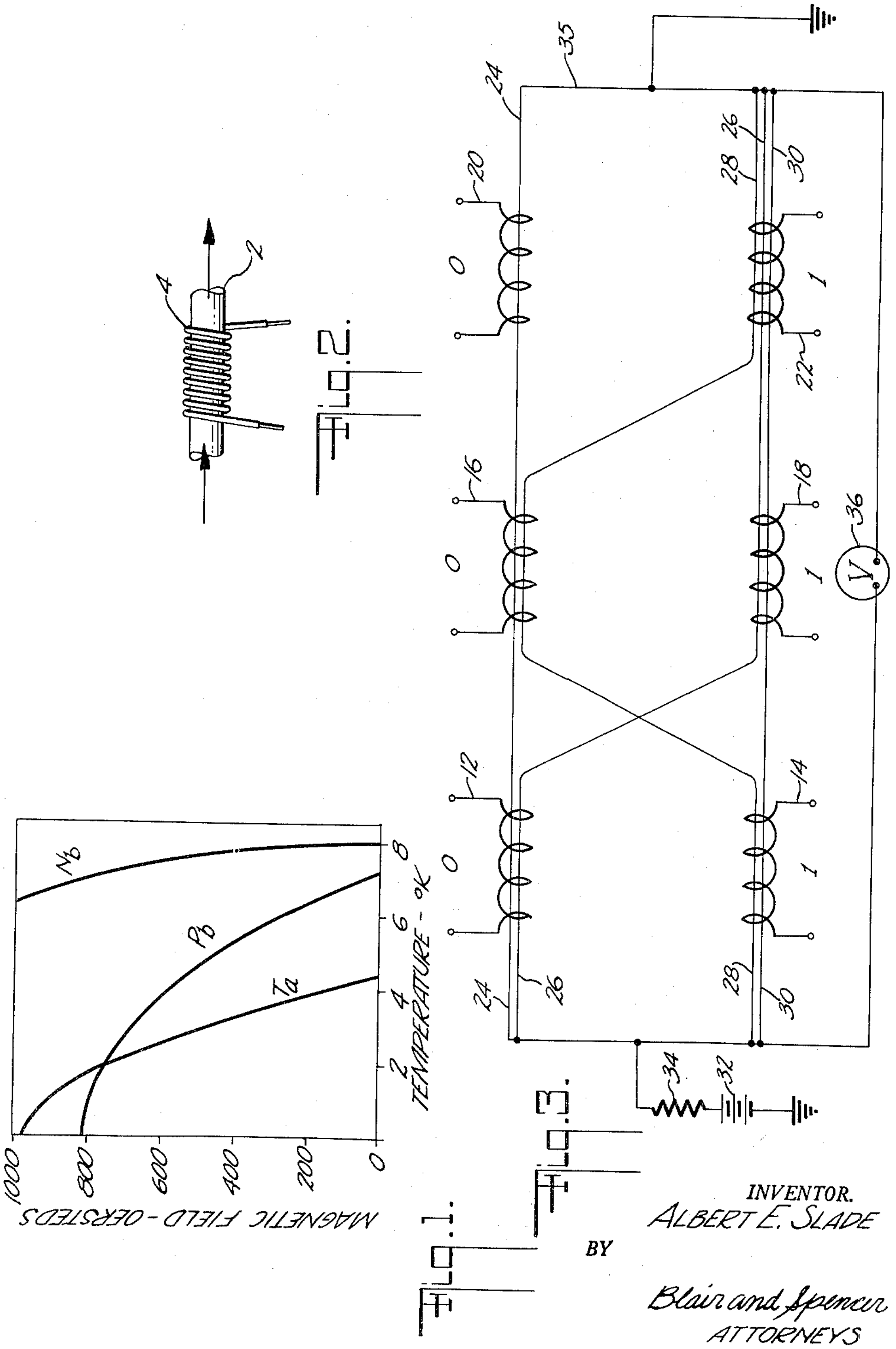
Figure 4:
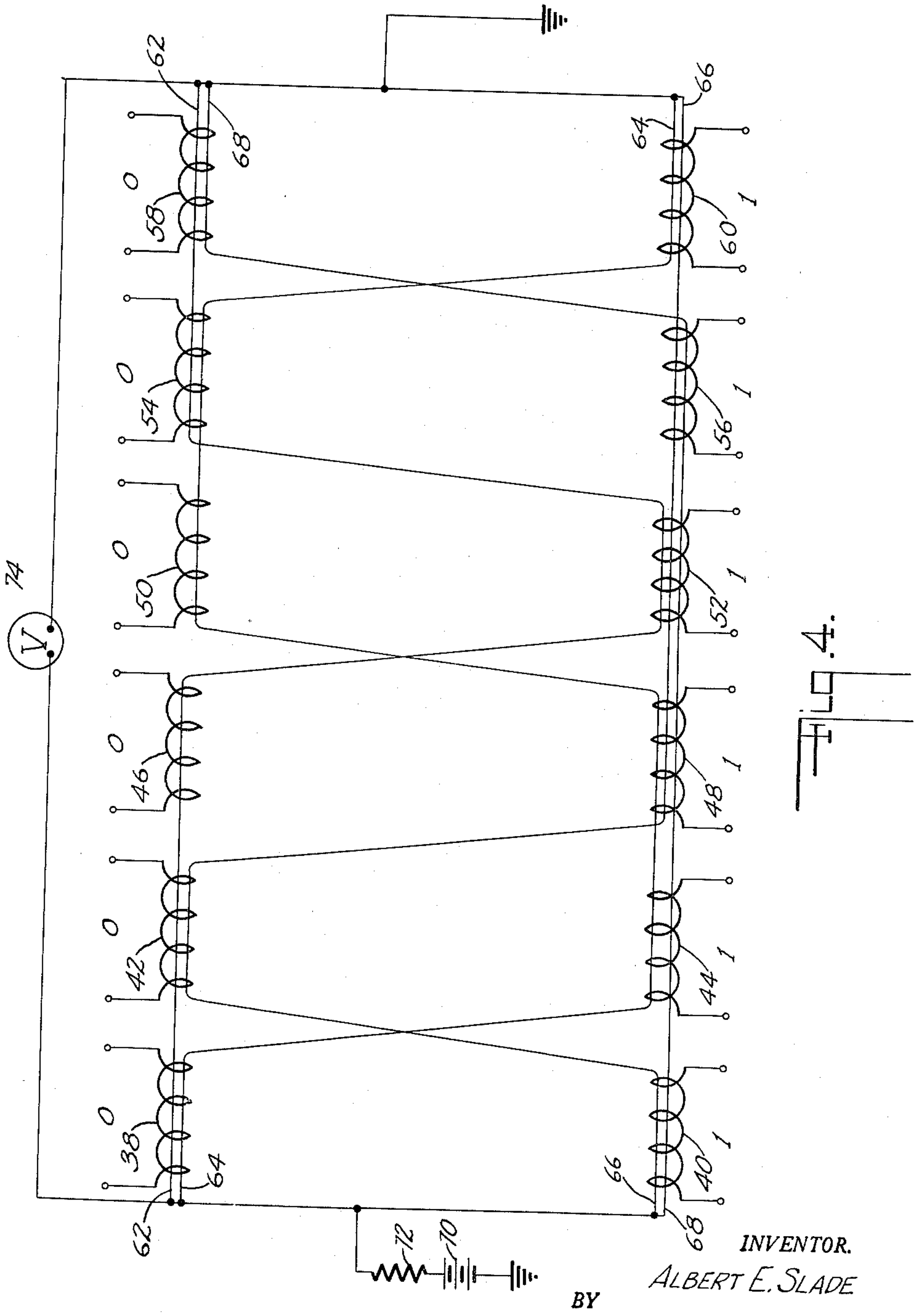

This invention relates to a computer memory for storing digital words in which the word stored may be represented by the presence or absence of a superconductive wire. More particularly, it relates to a memory in which each word may be represented by a single such wire and which may also function as a translator or arithmetic element. The construction and operation of my cryotron memory may best be understood from the following description taken with the accompanying drawings in which:

FIGURE 1 is a family of curves for different materials showing how the temperature at which certain materials become superconductive changes as a function of applied magnetic field, FIGURE 2 is a semi-diagrammatic representation of a conventional cryotron, FIGURE 3 is a diagrammatic representation of my cryotron memory, and FIGURE 4 is a diagrammatic representation of a translator or arithmetic element incorporating the memory of FIGURE 3.

The cryotron, which is a switching element useful in digital computers, depends for its operation on the changes in resistive properties of certain electrical conductors when subjected to temperatures approaching absolute zero. In the absence of a magnetic field, these materials change suddenly from a resistive state to a superconductive state in which their resistance is identically zero as the temperature approaches absolute zero. The temperature at which this change occurs is known as the transition temperature. When a magnetic field is applied to the conductor, the transition temperature is lowered, the relationship between applied magnetic field and transition temperature for certain specific materials being shown in FIGURE 1. As shown in this figure, in the absence of a magnetic field, tantalum loses all electrical resistance when reduced to a temperature of 4.4° K. or below, lead does so at 7.2° K. and niobium at 8° K. In all, there are 22 elements in addition to many alloys and compounds which undergo transition to the superconductive state at temperatures ranging between 0 and 17° K. The presence of a magnetic field causes the normal transition temperature to move to a lower value, or if a constant temperature is maintained, a magnetic field of sufficient intensity will cause the superconductive material to revert to its normal resistive state. From FIGURE 1 it is apparent that a magnetic field of between 50 and 100 oersteds will cause a tantalum wire held at 4.2° K. (the temperature of liquid helium at atmospheric pressure) to change from a super-conducting to a resistive state.

The cryotron is a circuit element which makes use of this shift between the superconductive and normally resistive states of these materials under the influence of a magnetic field when held at constant low temperatures. A typical cryotron is illustrated in FIGURE 2 and includes a central or gate conductor 2, about which is wound a control coil 4, both the gate conductor and the coil being of materials which are normally superconductive at depressed temperatures. The entire unit is immersed in liquid helium to render the gate wire 2 and the control wire 4 superconductive. If a current of sufficient magnitude is applied to the control coil, the magnetic field produced thereby will cause the gate conductor to transfer from a superconductive to a resistive state. Thus the control coil and gate wire form an electrically operated switch which can be changed from a superconductive to a resistive state by the application of current to the control coil.

Tantalum is the preferable material for gate conductors, since its transition temperature in the 50 to 100 oersted region is 4.2° K., the boiling point of helium at atmospheric pressure. This temperature is attainable without the use of complicated pressure or vacuum equipment for raising or lowering the temperature of helium. Niobium, which has a relatively high quenching field (the field strength required to render a superconductive material resistive), is usually used as the material for the control coil since it is desirable, and in many cases necessary, that the control conductor remain superconductive throughout the operation of the cryotron; this coil is subjected to substantially the same magnetic fields as those imposed on the gate conductor. Moreover, in most applications it is desirable to have the control conductor in the form of a coil such as the coil 4 in FIGURE 2, since this configuration concentrates the magnetic flux and thus reduces the current necessary to produce a quenching field.

In practice the cryotron of FIGURE 2 may have a gate conductor 2 of 0.009 inch tantalum wire with a single layer control coil 4 of 0.003 inch niobium wound at a pitch of 250 turns per inch, the overall length of the cryotron being approximately 1 inch. In addition to exceedingly small size, cryotrons have the advantage of low power dissipation. Thus, the cryotron is well suited for use as a basic element in binary digital computers, and various computer circuits such as flip-flops, etc., have been designed incorporating this element.

Modern digital computers and allied apparatus generally require memory elements of various types. In memories designed for short term storage of digits, the contents of the memory may be changed, often after short intervals. These short term memories may include a series of flip-flops for storing numbers to be operated upon, or they may be magnetic cores, tapes or drums. In addition to digits, the short term memories may also store instructions relating to the operations to be performed on the stored digits.

Digital computers also may require memories whose contents may not be changed or are changed only infrequently. For example, in certain applications a fixed memory may be required to give a yes or no answer as to whether a given item is stored therein. Thus a piece of random information may be fed to such a memory which includes all information of a particular class to determine whether the random information falls within the particular classification. If the memory produces a "yes" answer, then the random information is the same as some information stored in the memory, and accordingly the random information is classified. A "no" answer indicates a non-correspondence, and the random information must be classified elsewhere. As an example, it may be desirable during the operation of a computer to know whether certain numbers are prime numbers. A fixed memory may be formed containing all the prime numbers within the range of the computer. Whenever the memory is interrogated by reading a number into it, it will respond with a "yes" or "no" answer which determines whether or not the number is a prime. It is apparent that memories of this type may require a capacity of many thousands of items of information, and in present computers this requires complex and expensive equipment. Moreover, in present memory devices used for such purposes, considerable time is required in searching the memory to locate the information stored therein.

Fixed memories may also be used in translators which, in the computer sense, are devices for translating from one digital code to another. Computing units which perform arithmetic functions, such as adding or multiplying, are also translators in the broad sense. Two numbers are read into these units, and the output signal is another number which is a unique function of the two input numbers. Thus the two input numbers have been "translated" to a third number.

In digital computers using cryotrons as basic computing elements, it is desirable to use memories which operate in the same manner as cryotrons and are adapted for use therewith. Moreover, in computers and translators made with conventional circuit elements, memories having the desired storage capacity require large space and in some cases a great number of relatively unreliable components, making a memory operating on cryotron principles desirable in these applications as well.

Accordingly, it is an object of my invention to provide an improved memory capable of storing a plurality of digital words. It is another object of my invention to provide a memory of the above character utilizing the superconductive properties of certain materials at depressed temperatures. It is a further object of my invention to provide a memory for use in computers, particularly cryotron computers. It is another object of my invention to provide a memory of the above character capable of high speed operation. It is a still further object of my invention to provide a memory of the above character which may be used as a translator. It is another object of my invention to provide a memory of the above character which is a fixed memory. Another object of my invention is to provide a system of the above character having low power dissipation and a large capacity per unit volume. A further object of my invention includes a memory of the above character wherein the input elements are capable of efficient operation in conjunction with cryotron devices such as flip-flops, etc., a desirable feature when they are used in cryotron computers. An additional object of my invention is to provide a system of the above character wherein the memory is low in cost to permit manufacture of an economical unit having a large storage capacity. Further objects and features of my invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims to follow.

In general, there is illustrated in FIGURE 3 a four-word memory made according to my invention. This memory comprises a plurality of control coils 12, 14, 16, 18, 20 and 22 similar to the control coil 4 in FIGURE 2. These coils are arranged in input pairs for use with a digital computer or the like utilizing a binary code. Thus one coil of a given pair is energized for a Zero input and the other is energized for a One input. Each pair may be said to form a control station. More particularly, coils 12, 16 and 20 may be utilized as Zero inputs and coils 14, 18 and 22 as One inputs. A series of gate conductors or wires 24, 26, 28 and 30 are threaded through the control coils, each conductor passing through a different combination of coils. These wires are made of material, such as tantalum, which is superconductive at the temperature of operation of the memory. Conductor 24 is threaded through Zero coils 12, 16 and 20 and corresponds to the binary digital word 000. Conductor 26 is threaded through Zero coil 12 and One coils 18 and 22 and thus corresponds to the word 011, and so on. The gate conductors are tied together at one end, illustratively by a wire 31, and to a power supply illustratively indicated by the battery 32 and resistor 34, the resistor preferably having much greater resistance than the remainder of the circuit so that the power supply is essentially a constant current source. The other ends of the gate conductors are also tied together, illustratively by a wire 35, and for purposes of illustration, returned directly to ground or the other side of the battery 32. In case they are returned to ground through other circuit elements, these latter elements should be superconductive for proper operation of the circuit. Means for reading the voltage across the memory is illustratively indicated by the voltmeter 36. During operation the entire unit may be immersed in a bath of liquid helium to maintain the gate conductors in a superconductive state. The wires 31 and 35 should also be superconductive at the temperature of operation.

In operation, control currents are impressed on either the Zero (12, 16, 20) or One (14, 18, 22) coil at each station to cause the gate conductors passing therethrough to become resistive. As will be shown, upon any combination of coil energization there is only one possible gate conductor which may remain superconductive, all remaining becoming resistive under the influence of the magnetic fields developed in the coils. If this one possible superconductive gate conductor is present in the memory, there will be zero resistance across the memory and the voltage developed thereacross as indicated by the voltmeter 36 will be zero. On the other hand, if this conductor is not present, the memory will be resistive and a voltage will be developed thereacross and indicated by the meter. Thus, if each word stored in the memory is represented by a gate conductor, the presence or absence of a word in the memory may be indicated by the presence or absence of the corresponding gate conductor as shown by the reading on the meter 36.

More particularly, the memory shown in FIGURE 3 has the physical appearance of a rope in which coils are wound about various groups of strands. The gate conductors may be formed from 1 to 3 mil tantalum wire, the lower size limit being determined by the problems involved in handling, connecting, welding, etc., fine wire. The wire should be as small as possible to minimize the cross sectional area of the control coils which are wound about the gate conductors. The inductance of the coils and thus the switching time of the memory when driven from another cryotron device may thereby be maintained at a minimum. Tantalum is a preferable material for the gate conductors because of the relatively low magnetic field intensity required to render it resistive at the preferred temperature of operation of the memory.

The control coils 12, 14, 16, 18, 20, and 22 may be formed from 3 mil closely wound niobium wire which is not quenched by the current required to quench the gate conductors. Where input signals to these coils are supplied from other cryotron elements, the coils should be capable of developing a quenching field of approximately 100 oersteds over their entire cross sectional area without causing self-quenching of the cryotron gate conductors to which they may be connected. For example, in the memory illustrated in FIGURE 3, controil coils 1 inch long and having approximately 250 turns per inch would provide sufficient field to quench tantalum gate wires, and yet not require currents sufficient from cryotron flip-flops to cause self-quenching of the tantalum gate conductors therein. In applications not requiring inputs from other cryotron devices, the input coils need not be superconductive and may have any number of turns consistent with the current capabilities of the input signal sources. Insulation on the gate conductors and the control coils should be as thin as possible. Illustratively, it may be a one-half mil coating of sintered polytetrafluoroethylene.

Still referring to FIGURE 3, information in the form of binary digits is fed into the control coils in the form of a current of sufficient magnitude to quench the gate conductors enclosed therein. This control current is passed through the complement coils of the wire corresponding to the word whose presence in the memory is to be determined. The complement of a given binary number is that binary number in which all the One digits are changed to Zero, and all the Zero digits are changed to One, e.g., the complement of 011 is 100. Thus, the complement coils for a wire in the memory of FIGURE 3 are the coils through which the wire does not pass. For example, the 101 conductor 28 passes through One coil 14, Zero coil 16, and One coil 22. The complement of 101 is 010, corresponding to coils 12, 18 and 20 through which the wire does not pass. Also, the 101 wire 28 is the only wire which may be in the memory and not pass through any of the coils 12, 18 or 20, since a wire not passing through any of these three coils must pass through coils 14, 16 and 22, the path taken by the wire 28. Thus, every other gate wire except wire 28 must pass through either coil 12, coil 18 or coil 20 and therefore be rendered resistive by energization of these latter three coils.

If, for example, it is desired to ascertain the presence of the word 101 in the memory of FIGURE 3, the memory is energized with the 010 input of the desired word, and this results in a superconductive path indicating the presence of the word 101. On the other hand, suppose it is desired to determine the presence of the word 100. In this case, the complement coils 011 are energized. Since the wire 100 is missing from the memory and since every other wire must pass through either Zero coil 12, One coil 18 or One coil 22, the path through the memory will be resistive and a voltage thereacross will be shown by the meter 36 indicating the absence of the word.

While I have illustratively described the principle of operation with respect to the three-station memory shown in FIGURE 3, the same principles of operation hold true for a memory having any number of stations. Moreover, it will be apparent that my memory in its broader aspects may have two groups of control coils for each control station with a plurality of coils in each group and with one gate conductor passing through each coil. All Zero coils of each group would be connected together, preferably in series, as would the One coils; the memory would then be in the form of a conventional matrix device.

It will be noted that the total number of possible combinations of coils through which the gate conductors may pass is $2^n$ for a binary memory of the type illustrated in FIGURE 3, where $n$ is the number of control stations. However, the total number of gate wires in the memory, when used to give "yes" or "no" answers, need never be more than $2^n/2$. Where more than half the possible words are to be stored, the words stored in the memory may be indicated by missing wires, and those not in the memory by wires which are present. In such case the operation is the same as when the gate conductors represent stored words, i.e., the complement coils for the desired word are energized. However, when the memory is interrogated and the word is present, i.e., there is no corresponding gate wire, the memory will be resistive and the voltmeter 36 will indicate a voltage thereacross. If the word is missing, as determined by the presence of a corresponding gate wire, there will be a superconductive path through the memory and the voltmeter 36 will register zero voltage. For example, suppose that the absence of a superconductive path indicates the storage of a word in the memory of FIGURE 3 and that it is desired to determine the presence or absence of the word 101. Quenching current is applied to the complement coils 010. If the wire 101 is missing, the memory will become resistive and a voltage will appear thereacross, since, as pointed out above, only the 101 wire can escape quenching during this interrogation. However, if the 101 wire is present as is the case in FIGURE 3, there will be a superconductive path through the memory indicating the absence of the word by zero voltage reading on the voltmeter 36.

The applications of my cryotron memory in determining whether a random piece of information belongs to a particular classification are thus readily apparent. As previously explained, it may be desired to determine in a computer whether a given number is a prime or not. A memory may be constructed in which the word wires or gate conductors are threaded through the series of coils corresponding to the prime numbers. Then the memory may be interrogated in the manner described to determine whether any given number is stored in the memory. If so, the number is a prime number. Thus, if it is desired to determine during computer operation which numbers in the group from 0 to 20 are prime numbers, a five-station memory of the type illustrated in FIGURE 3 may be constructed with gate conductors passing through control coils in the combinations 00011, 00101, 00111, and so on, corresponding to prime numbers 3, 5, 7, etc. Interrogation in the manner described above will determine which numbers in the group are primes.

The cryotron memory made according to my invention is exceedingly small in size. For example, a twenty-digit memory capable of storing approximately a half million words will fit into a space less than 3 inches by 3 inches by 3 feet long. Moreover, only two internal connections are required, a weld at each end of the memory sufficing to join together the gate conductors; the external connections required are only those for feeding information into the control coils and for passing current through the memory and reading voltage across it. Thus, for its capacity the memory is of simple construction and assembly operations are minimized, an important factor when dealing with wire so small in size. It will be understood that while the voltmeter 36 is illustratively used to obtain answers from the memory, various means other than voltmeters or like devices may be used for automatically determining the presence or absence of the superconductive path through the memory and utilizing these answers in other units of the computer or in other devices. Also, where a memory has a large number of gate conductors it may be desirable to amplify the voltage across is.

In FIGURE 4 I have illustrated a six station memory which may be used as a translator. This memory has control coils 38, 40, 42, 44, 46, 48, 50, 52, 54, 56, 58, and 60 and gate wires 62, 64, 66, and 68. Power for the gate conductors is supplied by a power supply similar to that of FIGURE 3, comprising a battery 70 and a resistor 72. The gate conductors are joined together at both ends, just as in the memory previously described, one end being connected to the power supply and the other end being illustratively returned to ground. A voltmeter 74 illustratively indicates the voltage across the memory.

The circuit of FIGURE 4 may operate as a combined "yes-no" memory and binary translator in the following manner. A three-digit binary number may be read into the three-stations on the left, and the voltmeter 74 will indicate the presence or absence of a corresponding wire or stored word in the manner described above. For example, it may be desired to ascertain the presence of the number 101 in the memory and, if present, encode it in another binary form. Accordingly, complement coils 38, 44 and 46 are energized and the presence of a superconductive path through the circuit, i.e., the unquenched 101 gate conductor 66, determines the presence of the word 101 as indicated by a zero reading on the voltmeter 74.

The output section of the memory circuit comprises the three right-hand stations, and to determine the output code for the word represented by the gate conductor 66, coils 52, 56 and 60 or coils 50, 54 and 58 may be sequentially energized concurrently with the energization of the read-in coils 38, 44 and 46. While only one set of output coils are described as being used in the following description, for flexibility of use both sets, i.e., the Zero coils and the One coils, are preferably included. Thus, with the read-in coils energized, a quenching current may be applied to coil 52 and since the wire 66 passes therethrough, it will become resistive and there will be no superconductive path through the circuit. This will be indicated on the voltmeter 74. Therefore, the first digit in the output code is a One. If the circuit did not become resistive upon energization of the One coil 52, the first output digit would be a Zero. The current through coil 52 is then interrupted and coil 56 energized to indicate in the same manner the second digit in the output code; and finally coil 60 is energized. In this manner it will be determined that 101 in the input code corresponds to 111 in the output code. In like manner it may be determined that the translation of the input 011 is 001.

Thus, as previously mentioned, the output stations of the translator need have but one coil each, either a Zero or a One coil, since interrogation requires that only one coil at a station be energized. Moreover, when my prewired memory is used as a translator, words will always be represented by gate conductors since the reading out can be accomplished only for wires threaded through the output coils. Thus a translator may have all the possible ($2^n$) word wire combinations, if desired.

My basic memory circuit may be efficiently used in the translation of one alphabetical language to another. Thus, the input section may comprise a plurality of stations, five stations being required for read-in of each letter, e.g., the letter "A" may be represented by the code binary number 00001, "B" by 00010, etc. The input section may be arranged to provide for feeding in English words and the gate conductors may be threaded through the output to control coils in the output section corresponding to the binary code for German words. Thus a compact, high speed English to German and German to English translator may be constructed.

Another application of my translator according to my invention is in binary-to-decimal conversion. In the binary section such a translator would have as many stations as there are binary digits in the highest number to be operated on; the decimal section would have as many stations as there are decimal digits in the highest number, each decimal station having ten control coils. Thus, in the decimal section the first station might correspond to units, the second to tens, the third to hundreds, and so on; and each coil at a station might correspond to one of the decimal digits, 0 to 9. Accordingly, the gate conductor threaded through coils giving 1100 in the binary section would be threaded through the One coil in the tens station and the Two coil in the units station of the decimal section, corresponding to the number 12. Translation from binary to decimal digits would then be accomplished in the above manner by energizing the complement coils of the number in the binary section and then energizing in turn each coil at each decimal station until resistivity is attained. The decimal coil producing resistivity will correspond to the decimal digit at its station.

My pre-wired cryotron memories may also be used as arithmetic elements. For example, in multiplication a series of stations may be used for reading in the multiplier; a second series of stations for reading in the multiplicand and a third series for reading out the product. Thus, when numbers have been read into the multiplier and multiplicand stations, one wire and only one will remain superconductive, as described, and this wire will correspond to the product of the two numbers. This product wire may be threaded through the coils in the product section corresponding to the product of the two numbers. The product may then be read out of this section in the manner described.

A pre-wired memory of this type may also be used for the cataloguing of large amounts of information, as, for example, in a library. In such an application, one series of control stations would be provided for the name of a book, a second series for the author's name, a third series for the subject matter, a fourth for publication date, and a fifth for catalogue number, etc. By reading into the memory some of this information as, for example, the author's name, date of publication, and subject matter, the presence of a book having these characteristics in the library could be determined. If such a book does exist, then by using the read-out method and apparatus described the title and the catalogue number could be determined.

Another important application of such a memory is mechanized searching in the Patent Office. The memory, operating as a translator, would have a series of stations into which would be read the various properties, elements, functions, etc., desired, as encoded in binary form. Word wires passing through the various read-in coil combinations would also be threaded through read-out coils corresponding to patent numbers coded in binary form. Thus a searcher need only read in the desired combination of elements, etc., and this would be translated into patent numbers to be read out in the manner described.

Thus I have described a cryotron fixed memory circuit which may be used as a "yes-no" memory or a translator. As a translator it may function as an arithmetic element in a digital computer. My memory circuit, when in use in binary digital applications, comprises a series of pairs of control groups, each group preferably comprising a single control coil. Gate conductors representing words stored or not stored in the memory are threaded through coils of different stations in various different combinations. The presence or absence of the word in the memory may be indicated by the presence or absence of a superconductive path through the memory upon energization of the coils which leave superconductive only the wire representing the word looked for. The memory has a large capacity and yet is of simple construction and small size. Assembly is facilitated by the small number of connections and wires. The memory may be used as a translator by selecting a superconductive wire upon energization of read-in complement coils and then determining the read-out coils through which the wire passes. This determination may be accomplished by sequentially energizing the read-out coils, those which render the circuit resistive being the ones through which the wire passes.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A cryotron memory comprising, in combination, a plurality of stations, a plurality of control groups at each station, each of said control groups including a control conductor, magnetically independent gate conductors associated with said control conductors and adapted to transfer between superconductive and resistive states under the influence of changes in the magnetic fields developed by currents flowing in control conductors associated therewith, each of said gate conductors being associated with a single control group in each of said stations and with a different combination of control groups in said memory, superconductive means connecting one end of each of said gate conductors to one end of every other gate conductor, superconductive means connecting the other end of each of said gate conductors to the other end of every other gate conductor, said gate conductors being connected together only at said ends, thereby forming a composite conductor composed of said gate conductors connected in parallel, and sensing means for determining whether said composite conductor is resistive or superconductive.

2. The combination defined in claim 1 in which the number of gate conductors is less than the largest possible number of gate conductors each of which is associated with a different combination of control groups from every other gate conductor.

3. The combination defined in claim 2 in which each control group consists of a single control conductor.

4. The combination defined in claim 1 in which said sensing means includes means for passing electric current through said gate conductors and means for ascertaining the presence of absence of a voltage between said connecting means during the passage of said current.

5. A cryotron memory comprising, in combination, a plurality of pairs of control groups, each of said control groups including a control conductor, magnetically independent gate conductors associated with said control conductors and adapted to transfer between superconductive and resistive states under the influence of changes in the magnetic fields developed by currents flowing in control conductors with which they are associated, each of said gate conductors being associated with a single control group in a pair of control groups and with a different combination of control groups, superconductive means connecting one end of each of said gate conductors to one end of every other gate conductor, superconductive means connecting the other end of each of said gate conductors to the other end of every other gate conductor, said gate conductors being connected together only at said ends, thereby connecting said gate conductors in parallel to form a composite conductor composed of said gate conductors, and sensing means for determining whether said composite conductor is resistive or superconductive.

6. The combination defined in claim 5 including means for maintaining said gate conductors at a temperature below the transition temperature, whereby they are superconductive in the absence of an applied magnetic field.

7. The combination defined in claim 5 in which the number of gate conductors is less than the largest possible number of gate conductors each of which is associated with a different combination of control groups from every other gate conductor.

8. The combination defined in claim 7 in which the number of gate conductors is no greater than one half said largest possible member.

9. A cryotron memory comprising, in combination, a plurality of pairs of control conductors, magnetically independent gate conductors associated with said control conductors and adapted to transfer between superconductive and resistive states under the influence of changes in the magnetic fields developed by currents flowing in the control conductors associated therewith, each of said gate conductors being associated with a single control conductor in each of said pairs of control conductors and with a different combination of control conductors, superconductive means connecting one end of each of said gate conductors to one end of every other gate conductor, superconductive means connecting the other end of each of said gate conductors to the other end of every other gate conductor, said gate conductors being connected together only at said ends, thereby to form a conducting path comprising the parallel combination of said gate conductors and means for determining whether said conducting path is resistive or superconductive.

10. The combination defined in claim 9 in which the number of gate conductors is less than the largest possible number of gate conductors each of which is associated with a different combination of control conductors from every other gate conductor.

11. The combination defined in claim 9 in which each of said control conductors is in the form of a coil with the gate conductors associated therewith passing therethrough.

12. The combination defined in claim 9 in which said control conductors remain superconductive throughout operation of said circuit, whereby the inputs thereto may be from cryotron devices.

13. The combination defined in claim 9 in which said gate conductors are of tantalum and said control conductors are of niobium.

14. The combination defined in claim 9 including means for maintaining said gate conductors at a temperature below the transition temperature, whereby they are superconductive in the absence of an applied magnetic field.

15. The combination defined in claim 9 in which said sensing means includes means for passing an electric current through said gate conductors and means for determining the presence or absence of a voltage across said gate conductors during passage of said current.

16. A cryotron memory comprising, in combination, a plurality of pairs of control coils, magnetically independent gate conductors threaded through said control coils and adapted to transfer between superconductive and resistive states under the influence of changes in the magnetic fields developed by currents in control coils through which they pass, each of said gate conductors passing through a single control coil in each of said pairs of control coils and through a different combination of control coils, superconductive means connecting one end of each of said gate conductors to one end of every other gate conductor, superconductive means connecting the other end of each of said gate conductors to the other end of every other gate conductor, said gate conductors being connected together only at said ends, thereby to form a conducting path composed of the parallel combination of said gate conductors, and means for determining whether said conducting path is resistive or superconductive.

17. The combination defined in claim 16 including means for determining the presence or absence of a voltage between said connecting means when a current is passed through it.

18. A cryotron memory comprising, in combination, a conductive unit comprising a plurality of parallel-connected gate conductors connected together only at the ends thereof, each of said gate conductors being adapted to transfer between superconductive and resistive states upon the application of a control magnetic field thereto, a plurality of control conductors, each of said control conductors being adapted to develop a control field during the passage of an electric current through it, each of said gate conductors being disposed in the control field of at least one of said control conductors, a plurality of said gate conductors being disposed in the control fields of a plurality of control conductors, whereby each of said gate conductors represents the storage or non-storage of a series of bits of information according to the combination of control conductors in whose control fields it is disposed, and sensing means for determining whether said conductive unit is superconductive or resistive.

19. The combination defined in claim 18 in which said sensing means is responsive to the voltage across said conductive unit.

References Cited in the file of this patent

UNITED STATES PATENTS 2,832,897 Buck ---------------- Apr. 29, 1958

OTHER REFERENCES

"The Cryotron—A Super Conductive Computer Component" (Buck), Proceedings of the I.R.E. Vol. 44, No. 4, April 1956.

"A Cryotron Catalog Memory System" (Slade et al.), Proceedings of the Eastern Joint Computer Conference, December 10–12, 1956, pp. 115–119.

UNITED STATES PATENT OFFICE

CERTIFICATION OF CORRECTION

Patent No. 3,001,179 September 19, 1961

Albert E. Slade

It is hereby certified that error appears in the above numbered patent requiring correction and that the said Letters Patent should read as corrected below.

Column 6, line 41, for "is" read -- it --; column 9, line 16, for "of", first occurrence, read -- or --.

Signed and sealed this 24th day of April 1962.

(SEAL)
Attest:

ESTON G. JOHNSON
Attesting Officer

DAVID L. LADD
Commissioner of Patents